(12) United States Patent
Suzuki et al.

(10) Patent No.: US 12,293,877 B2
(45) Date of Patent: May 6, 2025

(54) ELECTROLYTIC CAPACITOR

(71) Applicant: Panasonic Intellectual Property Management Co., Ltd., Osaka (JP)

(72) Inventors: Shinya Suzuki, Kyoto Fu (JP); Takahiro Kumakawa, Kyoto Fu (JP); Junichi Kurita, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/772,057

(22) PCT Filed: Oct. 29, 2020

(86) PCT No.: PCT/JP2020/040688
§ 371 (c)(1),
(2) Date: Apr. 26, 2022

(87) PCT Pub. No.: WO2021/085555
PCT Pub. Date: May 6, 2021

(65) Prior Publication Data
US 2022/0399168 A1 Dec. 15, 2022

(30) Foreign Application Priority Data
Oct. 31, 2019 (JP) .................. 2019-198874

(51) Int. Cl.
*H01G 9/012* (2006.01)
*H01G 9/08* (2006.01)
*H01G 9/15* (2006.01)

(52) U.S. Cl.
CPC ............ *H01G 9/012* (2013.01); *H01G 9/08* (2013.01); *H01G 9/15* (2013.01)

(58) Field of Classification Search
CPC ............ H01G 9/10; H01G 9/15; H01G 9/012
See application file for complete search history.

(56) References Cited

U.S. PATENT DOCUMENTS 6,185,091 B1    2/2001  Tanahashi et al.
2002/0001169 A1*  1/2002  Shiraishi ............... H01G 9/26
                                                      361/523

(Continued)

FOREIGN PATENT DOCUMENTS

CN    107026019 A        8/2017
JP    58030121 A    *   2/1983

(Continued)

OTHER PUBLICATIONS

International Search Report issued on Jan. 12, 2021 in International Patent Application No. PCT/JP2020/040688, with English translation.

(Continued)

*Primary Examiner* — David M Sinclair
(74) *Attorney, Agent, or Firm* — Rimon P.C.

(57) ABSTRACT

An electrolytic capacitor including: an element stack including a plurality of capacitor elements; a package body sealing the element stack; and a first and second external electrode. Each of the capacitor elements includes a first end at which the anode body is exposed, and a second end covered with the cathode section, with at least an end surface of the first end exposed from the package body. The capacitor elements include a first capacitor element in which the first end faces a first surface of the package body, and a second capacitor element in which the first end faces a second surface different from the first surface of the package body. The first and second capacitor elements stacked alternately. The first end of the first capacitor element and the first end of the second capacitor element are electrically connected to the first external electrode and the second external electrode, respectively.

14 Claims, 12 Drawing Sheets

(56) References Cited

U.S. PATENT DOCUMENTS

| | | | | |
|---|---|---|---|---|
| 2004/0264111 A1* | 12/2004 | Shimoyama | ............ | H01G 9/012 |
| | | | | 361/523 |
| 2005/0047060 A1* | 3/2005 | Arai | ........................ | H01G 9/012 |
| | | | | 361/312 |
| 2005/0207090 A1* | 9/2005 | Kuriyama | ................. | H01G 9/14 |
| | | | | 361/271 |
| 2006/0260109 A1* | 11/2006 | Vaisman | ................. | H01G 9/042 |
| | | | | 29/25.42 |
| 2006/0285276 A1* | 12/2006 | Kuriyama | ............... | H01G 9/012 |
| | | | | 361/523 |
| 2009/0154067 A1 | 6/2009 | Kurita et al. | | |
| 2010/0165547 A1 | 7/2010 | Kuranuki et al. | | |
| 2010/0214038 A1 | 8/2010 | Kurita et al. | | |
| 2016/0012970 A1* | 1/2016 | Shin | ........................ | H01G 9/008 |
| | | | | 361/540 |
| 2016/0042873 A1* | 2/2016 | Kurita | ...................... | H01G 9/14 |
| | | | | 361/528 |
| 2017/0140877 A1 | 5/2017 | Kuromi | | |
| 2017/0287647 A1 | 10/2017 | Nobuta et al. | | |
| 2017/0365419 A1* | 12/2017 | Demizu | .................. | H01G 9/15 |

FOREIGN PATENT DOCUMENTS

| | | | | |
|---|---|---|---|---|
| JP | H11-288846 A | | 10/1999 | |
| JP | 2008021771 A | * | 1/2008 | |
| JP | 2008-078370 A | | 4/2008 | |
| JP | 2008-270317 A | | 11/2008 | |
| JP | 2009-123938 A | | 6/2009 | |
| JP | 2010-062406 A | | 3/2010 | |
| JP | 2010-097968 A | | 4/2010 | |
| JP | 2017-183555 A | | 10/2017 | |
| WO | 2009/028183 A1 | | 3/2009 | |
| WO | WO-2012140836 A1 | * | 10/2012 | ............. H01G 11/82 |

OTHER PUBLICATIONS

Chinese Office Action dated May 30, 2024 issued in the corresponding Chinese Patent Application No. 202080074770.4, with partial English translation.

Japanese Final Office Action dated Mar. 11, 2025 issued in the corresponding Japanese Patent Application No. 2021-553693.

\* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2020/040688, filed on Oct. 29, 2020, which in turn claims the benefit of Japanese Patent Application No. 2019-198874, filed on Oct. 31, 2019, the entire disclosures of which applications are incorporated by reference herein.

TECHNICAL FIELD

The present invention relates to an electrolytic capacitor.

BACKGROUND ART

An electrolytic capacitor includes a capacitor element, a package body sealing the capacitor element, and external electrodes electrically connected to the capacitor element on its anode side and on its cathode side, respectively. The capacitor element includes: an anode body having a first part including a first end (sometimes referred to as an anode leading part) and a second part including a second end (sometimes referred to as a cathode forming part), a dielectric layer formed at least on a surface of the second part of the anode body, and a cathode section covering at least part of the dielectric layer.

Patent Literature 1 proposes a solid electrolytic capacitor including an element stack in which flat plate-like capacitor elements each having an anode electrode part and a cathode electrode part are stacked in even numbers so that the anode electrode parts are arranged alternately in opposite directions. The solid electrolytic capacitor of Patent Literature 1 further includes: a pair of anode comb terminals joined to the anode electrode parts positioned at both ends of the element stack, so as to combine them together on each side; a cathode comb terminal joined to the lower surface of the cathode electrode part positioned at the center of the element stack; a pair of anode terminals provided on the lower surfaces of the pair of anode comb terminals; and a pair of cathode terminals joined to the cathode comb terminal. The pair of anode terminals are connected to each other by a plate-like inductor part. The pair of cathode terminals are respectively joined, in the direction intersecting the inductor part, to the cathode comb terminal at both ends of its lower surface. Patent Document 1 proposes to use this configuration for reducing the ESL (equivalent series inductance) of an electrolytic capacitor.

CITATION LIST

Patent Literature

[PTL 1] Japanese Laid-Open Patent Publication No. 2008-78370

SUMMARY OF INVENTION

However, with the solid electrolytic capacitor as disclosed in Patent Document 1, in which the anode electrode parts are electrically connected to the external electrode via the anode comb terminals, it is difficult to increase the capacitance of the capacitor because the space for the capacitor element is restricted due to the space occupied by the anode comb terminals.

One aspect of the present invention relates to an electrolytic capacitor, including: an element stack including a plurality of capacitor elements stacked together; a package body sealing the element stack; a first external electrode; a second external electrode; and a third external electrode, each of the plurality of the capacitor elements including an anode body having a porous portion at a surface, a dielectric layer formed on at least part of a surface of the porous portion, a cathode section covering at least part of the dielectric layer, a first end at which the anode body is exposed, and a second end covered with the cathode section, wherein at least an end surface of the first end is exposed from the package body, the plurality of the capacitor elements including a first capacitor element in which the first end faces a first surface of the package body, and a second capacitor element in which the first end faces a second surface different from the first surface of the package body, wherein in the element stack, the first capacitor element and the second capacitor element are stacked alternately, the first end of the first capacitor element is electrically connected to the first external electrode, and the first end of the second capacitor element is electrically connected to the second external electrode, and the third external electrode is electrically connected to the cathode section of the capacitor element.

According to the present invention, a high capacitance of the electrolytic capacitor can be achieved, while the ESL thereof is maintained low.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

[Electrolytic Capacitor]

Figure 1:
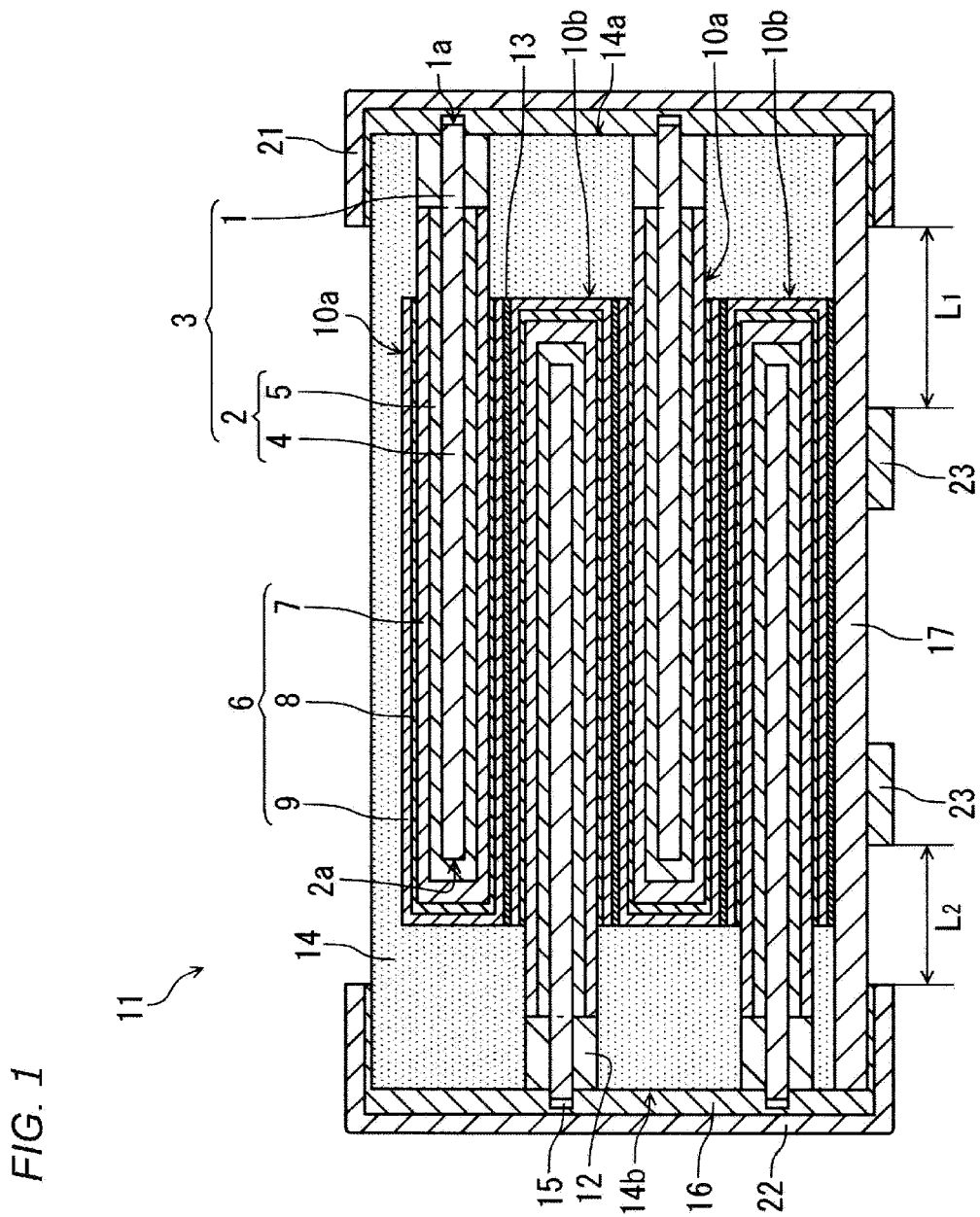
FIG. 1 A schematic cross-sectional view of an electrolytic capacitor according to one embodiment of the present invention.

An electrolytic capacitor according to an embodiment of the present invention includes an element stack including a plurality of capacitor elements stacked together, a package body sealing the element stack, a first external electrode, a second external electrode, and a third external electrode. Each of the plurality of the capacitor elements includes an anode body having a porous portion at a surface, a dielectric layer formed on at least part of the surface of the porous portion, a cathode section covering at least part of the dielectric layer, a first end at which the anode body is exposed, and a second end covered with the cathode section.

The plurality of the capacitor elements each include an anode body having a porous portion at its surface, a dielectric layer formed on at least part of the surface of the porous portion, and a cathode section covering at least part of the dielectric layer. The plurality of the capacitor elements each has a first end at which the anode body is exposed, and a second end covered with the cathode section, with at least the end surface of the first end exposed from the package body.

Of the plurality of the capacitor elements, some have the first end facing a first surface of the package body, and some have the first end facing a second surface of the package bod different from the first surface. The capacitor element in which the first end faces the first surface of the package body is referred to as a first capacitor element, and the capacitor element in which the first end faces the second surface different from the first surface of the package body is referred to as a second capacitor element. The first end of the first capacitor element is electrically connected to the first external electrode, and the first end of the second capacitor element is electrically connected to the second external electrode.

According to this configuration, the current flowing in the first capacitor element is different in direction from the current flowing in the second capacitor element. The magnetic fields are generated in different directions by these currents, and thus, the magnetic flux generated in the element stack decreases. As a result, the ESL is reduced. Preferably, the first surface and the second surface may be the surfaces of the package body facing each other. Furthermore, when the first capacitor element and the second capacitor element are alternately stacked, the magnetic flux generated in the element stack can effectively decrease. Therefore, the ESL can be effectively reduced.

The number of the first capacitors and the number of the second capacitors may be the same. When the number of first capacitors and the number of second capacitors are the same, the magnetic fields generated by the current flowing in the first capacitor element and by the current flowing in the second capacitor element are cancelled out each other without excess or deficiency, and the magnetic flux generated in the element stack decreases. Therefore, the ESL can be easily reduced.

The electrical connection between the element stack and the external electrode can be achieved by electrically connecting the end surface of the first end exposed from the package body of each capacitor element to the external electrode (first or second external electrode). The electrical connection between the end surface of the first end and the external electrode can be achieved, for example, by using an external electrode formed along the first surface or the second surface, or by electrically connecting an intermediate electrode (corresponding to an anode electrode layer as described later) formed along the first surface or the second surface to the external electrode. In this case, it is not necessary to provide another member within the package body, between the first end and the external electrode (first or second external electrode) for electrical connection therebetween, and the capacitance of the electrolytic capacitor can be easily increased. Furthermore, in the current path from a portion of the anode body where the cathode section is not formed (an anode leading part) to the first or second external electrode, the length of the current path flowing in parallel to the stacked surface of the element stack is substantially equal to the length of the anode leading part, and is easily shortened. Therefore, the ESL generated by the current flowing along the path parallel to the stacked surface of the element stack can be further reduced. At a side surface intersecting the first surface or the second surface, the end surface of the first end may be exposed from the package body. In this case, the end surface of the first end at the side surface intersecting the first surface may be electrically connected to the first external electrode.

The third external electrode is electrically connected to the cathode section of the capacitor element. The third external electrode is electrically connected to the cathode section, for example, in the outermost layer (i.e., the lowermost or uppermost layer) of the element stack. The cathode terminal can be thus disposed at the bottom of the electrolytic capacitor. On the other hand, by extending the first or second external electrode onto the bottom of the electrolytic capacitor, the anode terminal can be disposed at the bottom of the electrolytic capacitor. In this case, the current flows through the extended portion of the first or second external electrode in the direction opposite to the direction of the current flowing through the anode leading part. Thus, the magnetic field generated by the current flowing through the anode leading part is canceled out by the magnetic field generated by the current flowing through the extended portion of the first or second external electrode, and the ESL of the electrolytic capacitor can be further reduced. As a result, the clearance between the cathode terminal and the first and/or the second external electrode can be shortened by the presence of the extended portion, leading to an improved ESL. These effects work synergistically to reduce the ESL remarkably. The third external electrode may be electrically connected to the cathode section at the side of the element stack.

The first end may be electrically connected to the first external electrode or the second external electrode via a contact layer. The contact layer can be formed, for example, selectively on the end surfaces of the first ends of the plurality of the capacitor elements. The contact layer can provide connection between each of the first ends of the plurality of the capacitor elements, and the intermediate electrode (anode electrode layer) formed so as to cover the first or second surface or the external electrode. With the contact layer interposed therebetween, the first ends and the external electrode can be electrically connected to each other more reliably. Therefore, the reliability of the electrolytic capacitor can be enhanced.

The first external electrode and the second external electrode may be faced each other in the longer direction or the shorter direction of the anode body. For example, the first external electrode and the second external electrode may be disposed respectively at the ends along the shorter direction or along the longer direction of one surface (e.g., bottom surface) of the package body. In order to reduce the ESL, the first external electrode and the second external electrode may be faced each other in the shorter direction of the anode body. On the other hand, when the first external electrode and the second external electrode are faced each other in the longer direction of the anode body, the first or second external electrode can be easily extended longer on the bottom surface of the electrolytic capacitor, and the clearance between the cathode terminal and the anode terminal can be easily controlled, and thus, the ESL can be easily controlled to a desired value.

Embodiment 1

Figure 2:
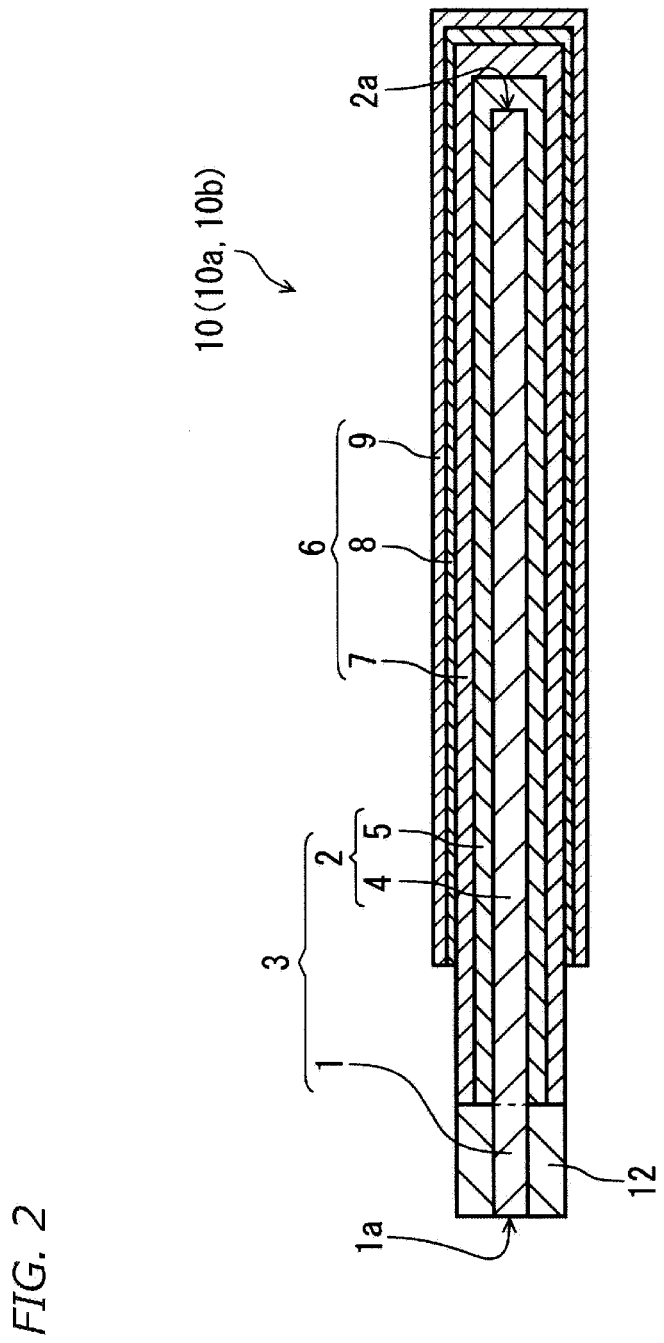
FIG. 2 A schematic cross-sectional view of a capacitor element used in an electrolytic capacitor.

FIG. 1 is a cross-sectional view schematically illustrating a structure of an electrolytic capacitor according to one embodiment of the present invention. FIG. 2 is a cross-sectional view illustrating a structure of a capacitor element constituting the electrolytic capacitor of FIG. 1. It is to be noted, however, that the electrolytic capacitor according to the present invention is not limited thereto.

As illustrated in FIGS. 1 and 2, an electrolytic capacitor 11 includes a plurality of capacitor elements 10 (10a, 10b). The capacitor elements 10 each include an anode body 3 and a cathode section 6. The anode body 3 is, for example, a foil (anode foil). The anode body 3 has a porous portion 5 at its surface, and a dielectric layer (not shown) formed on at least part of the surface of the porous portion 5. The cathode section 6 covers at least part of the dielectric layer.

In the capacitor element 10, the anode body 3 is exposed without being covered with the cathode section 6 at an end (first end) 1a on one side, and is covered with the cathode section 6 at an end (second end) 2a on the other side. In the following, a portion not covered with the cathode section of the anode body 3 is referred to as a first part 1, and a portion covered with the cathode section of the anode body 3 is referred to as a second part 2. The end of the first part 1 corresponds to the first end 1a, and the end of the second part 2 corresponds to the second end 2a. The dielectric layer is formed on the surface of the porous portion 5 formed at least at the second part 2. The first part 1 of the anode body 3 is also called an anode leading part. The second part 2 of the anode body 3 is also called a cathode forming part.

More specifically, the second part 2 has a core 4 and the porous portion (porous body) 5 formed at the surface of the core 4 by roughening (e.g., etching). On the other hand, the first part 1 may or may not have the porous portion 5 at its surface. The dielectric layer is formed along the surface of the porous portion 5. At least part of the dielectric layer covers the inner walls of the pores of the porous portion 5 and is formed along the inner walls.

The cathode section 6 includes a solid electrolyte layer 7 covering at least part of the dielectric layer, and a cathode leading layer covering at least part of the solid electrolyte layer 7. The surface of the dielectric layer has unevenness corresponding to the surface profile of the anode body 3. The solid electrolyte layer 7 can be formed so as to fill such unevenness of the dielectric layer. The cathode leading layer includes, for example, a carbon layer 8 covering at least part of the solid electrolyte layer 7, and a silver paste layer 9 covering the carbon layer 8.

Part of the anode body 3 where the solid electrolyte layer 7 is formed on the anode body 3 via the dielectric layer (porous portion 5) corresponds to the second part 2. Part of the anode body 3 where the solid electrolyte layer 7 is not formed on the anode body 3 via the dielectric layer (porous portion 5) corresponds to the first part 1.

In a region not facing the cathode section 6 of the anode body 3, a separation layer (or an electrically insulating member) 12 having electrically insulating properties is formed, at a portion adjacent to the cathode section 6, so as to cover the surface of the anode body 3. This restricts the contact between the cathode section 6 and the exposed portion of the anode body 3 (first part 1). The separation layer 12 is, for example, a resin layer having electrically insulating properties.

In the illustrated example of FIG. 1, four capacitor elements 10 (10a, 10b) are stacked such that the cathode sections 6 (second parts 2) are overlapped with each other. Among them, however, there are two kinds of capacitor elements differing in the direction in which the first part 1 of the anode body 3 is oriented. In FIG. 1, in the first capacitor element 10a, the first part 1 of the anode body 3 is oriented in one direction (the right direction in the figure) with respect to the second part 2. On the other hand, in the second capacitor element 10b, the first part 1 of the anode body 3 is oriented in the direction (the left direction in the figure) opposite to the direction in which the first part 1 of the first capacitor element 10a is oriented, with respect to the second part 2. The first capacitor element 10a and the second capacitor element 10b are alternately stacked, forming an element stack.

In the plurality of the capacitor elements 10 (10a, 10b), the cathode sections 6 adjacent to each other in the stacking direction are electrically connected to each other via an adhesive layer 13 having electrical conductivity. The adhesive layer 13 is formed of, for example, an electrically conductive adhesive. The adhesive layer 13 contains, for example, silver.

The electrolytic capacitor 11 includes the above-described element stack including a plurality of capacitor elements 10 (10a, 10b) stacked together, a package body 14 sealing the element stack, a first external electrode 21, a second external electrode 22, and a third external electrode 23. In the element stack, the end surface of the first end 1a is exposed from the package body 14.

The package body 14 has a substantially rectangular parallelepiped outer shape, and the electrolytic capacitor 11 also has a substantially rectangular parallelepiped outer shape. The package body 14 has a first surface 14a and a second surface 14b on the side opposite to the first surface 14a. In the element stack, the first end 1a of the first capacitor element 10a faces the first surface 14a (i.e., the first end 1a is nearer to the first surface than the second end 2a is), and the first end 1a of the second capacitor element 10b faces the second surface 14b (i.e., the first end 1a is nearer to the second surface than the second end 2a is).

In the electrolytic capacitor 11, each of the first ends 1a (first parts) exposed from the package body 14 is electrically connected to the first external electrode 21 extending along the first surface 14a or the second external electrode 22 extending along the second surface 14b. In this case, it is not necessary to bundle the first parts 1 together in order to form the anode of the electrolytic capacitor, and not necessary to allocate a certain length for bundling the first parts 1. Therefore, as compared to when bundling the first parts, the ratio of the first parts in the anode body can be reduced, and the capacitance can be increased. Furthermore, the ESL contribution due to the first parts can be reduced. Moreover, the clearance between the third external electrode 23 and the first and/or second external electrode can be shortened, which can improve the ESL.

In the electrolytic capacitor 11, the end surfaces of the first ends 1a exposed from the package body 14 are each covered with a contact layer 15. An anode electrode layer 16 covers the contact layers 15 and the first and second surfaces 14a and 14b of the package body 14. The first external electrode 21 and the second external electrode 22 cover the anode electrode layer 16, allowing a plurality of the first ends 1a (first parts) to be electrically connected to the first or second external electrode. Specifically, the anode electrode layer 16 covering the first surface 14a of the package body 14 is present between the contact layer 15 and the first external electrode 21, and the anode electrode layer 16 covering the second surface 14b of the package body 14 is present between the contact layers 15 and the second external electrode 22.

In the illustrated example of FIG. 1, the element stack is supported on a substrate 17. The substrate 17 is, for example, a laminated substrate with a conductive wiring pattern formed on its front and back sides. The wiring patterns on the front and back sides are electrically connected to each other via through-holes. The wiring pattern on the front side is electrically connected to the cathode section 6 at the lowermost layer of the capacitor element, and the wiring pattern on the back side is electrically connected to the third external electrode 23. In this way, via the substrate 17, electrical connection between the third external electrode 23 and the cathode sections 6 of the capacitor elements of the element stack is achieved. In this case, the number, the shape and the layout of the third external electrode can be optionally set, depending on the wiring pattern on the back side. The third external electrode 23 is formed on the substrate 17, for example, by plating. The substrate 17 with the third external electrode 23 formed thereon can be handled as one component.

At least a portion of the third external electrode 23 is exposed at the bottom of electrolytic capacitor 11. The portion of the third external electrode 23 exposed at the bottom constitutes a cathode terminal of the electrolytic capacitor 11. In the illustrated example of FIG. 1, two third external electrodes 23 are disposed with a space therebetween, and the third external electrodes are exposed in a plurality of regions.

A portion of the first external electrode 21 is bent along the bottom of the package body 14, and is exposed at the bottom of the electrolytic capacitor 11. Likewise, a portion of the second external electrode 22 is bent along the bottom of the package body 14 so as to face the bent portion of the first external electrode 21, and is exposed at the bottom of the electrolytic capacitor 11. The portion of the first external electrode 21 and the portion of the second external electrode 22 exposed at the bottom each constitute an anode terminal of the electrolytic capacitor. In short, in the present embodiment, the electrolytic capacitor 11 has two anode terminals spaced from each other. The cathode terminal can be present so as to be sandwiched between the two anode terminals spaced from each other.

The ESL of the electrolytic capacitor 11 depends on a clearance $L_1$ between the first external electrode 21 and the third external electrode 23 at the bottom, and, a clearance $L_2$ between the second external electrode 22 and the third external electrode 23 at the bottom. The shorter the clearances $L_1$ and $L_2$ are, the smaller the ESL tends to be.

In order to reduce the ESL, a plurality of the third external electrodes 23 may be disposed at the bottom. In this case, one of the plurality of the third external electrodes 23 can be placed in proximity to the first external electrode 21, and another one of the plurality of the third external electrodes 23 can be placed in proximity to the second external electrode 22. This can effectively reduce the ESL. The clearances $L_1$ and $L_2$ may be, for example, 0.4 mm to 1.1 mm.

Here, "having a plurality of the third external electrodes" means that the third external electrodes are exposed in a plurality of regions spaced from each other, and does not necessarily mean that the plurality of the third external electrodes are spaced from each other. For example, two or more of the plurality of the third external electrodes may be continuously formed within the package body and electrically connected to each other.

The plurality of the third external electrodes may be disposed on different surfaces of the package body. For example, one of them may be disposed at the top of the package body, and another one of them may be disposed at the bottom thereof.

In the electrolytic capacitor 11, the direction of the current flowing in the first capacitor elements 10a is opposite to that flowing in the second capacitor elements 10b. Therefore, the magnetic fields caused by the current flowing in the first capacitor elements 10a and by the current flowing in the second capacitor elements 10b are cancelled out each other, and the magnetic flux that occurs in the electrolytic capacitor 11 decreases. As a result, the ESL is reduced.

On the other hand, in the first part 1 and in a portion of the second part 2 where the capacitor elements are not overlapped (i.e., a portion not covered with the cathode leading layer, in FIG. 1), the magnetic field cancellation effect hardly occurs. In the electrolytic capacitor 11 of the present embodiment, however, it is easy to shorten the length of the first part 1. Therefore, the contribution of the ESL generated by the above part and portion can be reduced. Furthermore, the first external electrode 21 and the second external electrode are disposed so as to extend along the bottom of the package body 14. This can further reduce the contribution of the ESL generated by the above part and portion. As a result of the foregoing, the ESL of the electrolytic capacitor 11 can be significantly improved.

A detailed description will be given below of the component elements of the electrolytic capacitor according to the above embodiment.

(Anode Body 3)

The anode body may include a valve metal, an alloy containing a valve metal, a compound containing a valve metal (e.g., intermetallic compound), and the like. These materials can be used singly or in combination of two or more kinds. Examples of the valve metal include aluminum, tantalum, niobium, and titanium. The anode body may be a foil of a valve metal, an alloy containing a valve metal, or a compound containing a valve metal, and may be a porous sintered body of a valve metal, an alloy containing a valve metal, or a compound containing a valve metal.

When the anode body is a metal foil, in order to increase the surface area, a porous portion is usually formed at at least the surface of the second part of the anode foil. The second part has a core portion and a porous portion formed at the surface of the core portion. The porous portion may be formed by roughening at least the surface of the second part of the anode foil by, for example, etching. Surface roughening, such as etching, may be performed, with the surface of the first part masked with a predetermined masking member. Without masking, the entire surface of the anode foil may be roughened by etching or the like. In the former case, an anode foil having no porous portion at the surface of the first part and having a porous portion at the surface of the second part can be obtained. In the latter case, a porous portion is formed at the surface of the first part, in addition to at the surface of the second part. Any known technique may be used for etching, examples of which include electrolytic etching. The masking member is not limited, and may be an electrical insulator, such as a resin. Although removed before forming the solid electrolyte layer, the masking member may be an electrical conductor containing an electrically conductive material.

When the entire surface of the anode foil is roughened, the first part has a porous portion at its surface. Therefore, the porous portion and the package body lack sufficient adhesion therebetween, which may cause the entry of air (specifically, oxygen and water) into the electrolytic capacitor through the contact area between the porous portion and the package body. In order to suppress this, the first part having a porous portion may be compressed in advance, so that the pores of the porous portion are crushed. This can prevent the entry of air into the electrolytic capacitor through the porous portion from the first end exposed from the package body, and prevent the deterioration of the reliability of the electrolytic capacitor due to the above entry of air.

(Dielectric Layer)

The dielectric layer can be formed by, for example, anodizing the valve metal at at least the surface of the second part of the anode body, by chemical conversion or the like. The dielectric layer contains an oxide of a valve metal. For example, when the valve metal is aluminum, the dielectric layer contains aluminum oxide. The dielectric layer is formed at least along the surface of the second part where the porous portion is formed (including the inner walls of the pores of the porous portion). Without limited thereto, the dielectric layer may be formed by any method that can form an electrical insulating layer to function as a dielectric, on the surface of the second part. The dielectric layer may be formed also on the surface of the first part (e.g., on the porous portion at the surface of the first part).

(Cathode Section)

The cathode section includes a solid electrolyte layer covering at least part of the dielectric layer, and a cathode leading layer covering at least part of the solid electrolyte layer.

(Solid Electrolyte Layer)

The solid electrolyte layer includes, for example, an electrically conductive polymer. Examples of the conductive polymer include polypyrrole, polythiophene, polyaniline, and derivatives thereof. The solid electrolyte layer can be formed by, for example, chemically polymerizing and/or electrolytically polymerizing a raw material monomer on the dielectric layer. Alternatively, it can be formed by applying a solution or dispersion of the conductive polymer onto the dielectric layer. The solid electrolyte layer may contain a manganese compound.

(Cathode Leading Layer)

The cathode leading layer includes, for example, a carbon layer and a silver paste layer. The carbon layer has electrical conductivity, and can be formed of, for example, an electrically conductive carbon material, such as graphite. The carbon layer can be formed by, for example, applying a carbon paste onto at least part of a surface of the solid electrolyte layer. The silver paste layer may be formed of, for example, a composition containing silver powder and a binder resin (e.g., epoxy resin). The silver paste layer can be formed by, for example, applying a silver paste onto a surface of the carbon layer. Without limited thereto, the cathode leading layer may have any configuration that has a current collecting function.

(Separation Layer)

A separation layer with electrically insulating properties may be provided for electrically separating the first part from the cathode section. The separation layer can be provided in proximity to the cathode section, so as to cover at least part of the surface of the first part. Preferably, the separation layer is in close contact with the first part and the package body. This can suppress the aforementioned entry of air into the electrolytic capacitor. The separation layer may be disposed on the first part, with the dielectric layer interposed therebetween.

The separation layer includes, for example, a resin, examples of which include those as exemplified for the later-described package body. The dielectric layer formed on the porous portion of the first part may be compressed to be dense, so as to have electrically insulating properties.

The separation layer in close contact with the first part can be obtained by, for example, bonding a sheet-like insulating member (e.g., resin tape) to the first part. When using an anode foil having a porous portion at its surface, the insulating member may be brought into close contact with the first part after the porous portion of the first part is compressed and flattened. The sheet-like insulating member preferably has an adhesive layer at the surface on the side at which it is attached to the first part.

Alternatively, the insulating member in close contact with the first part may be formed by applying or immersing a liquid resin onto or into the first part. In the method using a liquid resin, the insulating member is formed so as to fill the unevenness at the surface of the porous portion of the first part. The liquid resin can easily flow into the recesses at the surface of the porous portion, so that the insulating member can be easily formed inside the recesses, too. For the liquid resin, a curable resin composition as exemplified in the later-described fourth step may be used.

(Package Body)

The package body preferably includes, for example, a cured product of a curable resin composition, and may include a thermoplastic resin or a composition containing a thermoplastic resin.

The package body can be formed using, for example, a molding technique, such as injection molding. The package body can be formed, for example, using a predetermined mold, by charging a curable resin composition or a thermoplastic resin (composition) into a predetermined place, so as to cover the capacitor element.

The curable resin composition may contain, in addition to a curable resin, for example, a filler, a curing agent, a polymerization initiator, and/or a catalyst. The curable resin is, for example, a thermosetting resin. The curing agent, the polymerization initiator, the catalyst, and other additional materials are selected as appropriate according to the kind of the curable resin.

For the curable resin composition and the thermoplastic resin (composition), those as exemplified in the later-described fourth step may be used.

The insulating member and the package body each preferably include a resin, in view of the close contact between the separation layer and the package body. The package body is more likely to come in close contact with the insulating member including a resin than with the first part containing a valve metal or the dielectric layer containing an oxide of the valve metal.

The separation layer and the package body preferably include the same resin as each other. This can further improve the adhesion between the separation layer and the package body, which can further suppress the entry of air into the electrolytic capacitor. The same resin as each other included in the separation layer and the package body is, for example, an epoxy resin.

The package body preferably includes a filler, in view of improving the strength and the like of the package body.

On the other hand, the separation layer preferably includes a filler having a particle diameter smaller than that included in the package body, and more preferably includes no filler. When the separation layer is formed by impregnating the first part with a liquid resin, the liquid resin preferably includes a filler having a particle diameter smaller than that included in the package body, and more preferably includes no filler. In this case, the liquid resin can be easily impregnated deep into the recesses at the surface of the porous portion of the first part, and the separation layer can be easily formed. Also, the separation layer can be easily formed to be thin so that a plurality of the capacitor elements can be stacked.

(Contact Layer)

The contact layer can be formed so as to cover the end surface of the first end of the anode body. Preferably, the contact layer can be formed so as to cover only the surface of the first end exposed from the package body, without covering as much as possible the surface of the package body (and, the separation layer) which is a resin material.

The contact layer may include a metal having an ionization tendency lower than that of the metal constituting the anode body. For example, when the anode body is an aluminum (Al) foil, the contact layer may be made of a material containing a metal, such as Zn, Ni, Sn, Cu, and Ag. In this case, the formation of a robust oxide film at the surface of the contact layer can be suppressed, and a more reliable electrical connection can be achieved, as compared to when the exposed portion of the anode body at the first end is directly connected to the external electrode.

An alloy layer may be formed at the interface between the contact layer and the anode body. For example, when the anode body is an aluminum (Al) foil, since Cu, Zn, or Ag has an atomic distance similar to that of Al, an alloy layer by intermetallic bonding with Al can be formed at the interface. This can make firmer the bonding strength to the anode body. The contact layer may be constituted of a single element metal of the above element, may be constituted of an alloy, such as bronze or brass, and may be a laminate of a plurality of metal layers of different simple elements (e.g., a laminated structure of a Cu layer and an Ag layer).

When the contact layer is formed, the package body preferably contains no filler, or when the package body contains a filler, the filler preferably has a Young's modulus smaller than that of the contact layer. In this case, the formation of the contact layer on the surface of the package body is suppressed, and the contact layer can be selectively formed on the end surface of the first end.

The contact layer can be formed by a technique, such as cold spraying, thermal spraying, plating, and vapor deposition. In the cold spraying, for example, metal particles in a solid state are forced to collide with the surface of the package body (first surface and/or second surface) including the exposed surface of the first end, thereby to be firmly attached through their plastic deformation to the surface, so that a contact layer containing a metal constituting the metal particles is formed on the end surface of the first end. In this case, when the Young's modulus of the metal particles is higher than that of the constituent member (e.g., the filler) of the package body, the metal particles having collided with the surface of the package body are hardly plastically deformed on the surface of the package body, and the firm attachment of the metal particles onto the surface of the package body can be suppressed. At least part of the energy due to the collision is used for destroying the package body, and the resin is partially scraped off. As a result, the contact layer can be selectively formed on the end surface of the first end of the anode body, and the surface of the package body (first surface and/or second surface) can be roughened.

(Anode Electrode Layer)

An anode electrode layer may be interposed between the contact layer and the external electrode (first or second external electrode). The anode electrode layer can cover the first or second surface of the package body, and can be electrically connected to the first end of the (plurality of) capacitor elements via the contact layer, if necessary.

The anode electrode layer may include an electrically conductive resin layer in which conductive particles are mixed. The conductive resin layer can be formed by applying and drying a conductive paste containing conductive particles and a resin material onto the first or second surface of the package body. The resin material is suitable for adhesion to a material constituting the package body and the anode body (contact layer), and can enhance the bonding strength, by chemical bonding (e.g., hydrogen bonding). Examples of the conductive particles include metal particles, such as silver or copper, and particles of a conductive inorganic material, such as carbon.

The anode electrode layer may be a metal layer. In this case, the anode electrode layer may be formed by a technique, such as electrolytic plating, electroless plating, sputtering, vacuum vapor deposition, chemical vapor deposition (CVD), cold spraying, and thermal spraying.

The anode electrode layer may cover part of the surface orthogonal to the first and second surfaces (e.g., top or bottom surface) of the package body.

The surface roughness Ra of the package body to be covered with the anode electrode layer may be 5 micrometers or more. In this case, the contact area between the anode electrode layer and the package body increases, and the adhesion between the anode electrode layer and the package body is improved by the anchor effect, which can further improve the reliability.

(External Electrode)

The first to third external electrodes are preferably a metal layer. The metal layer is, for example, a plating layer. The metal layer contains, for example, at least one selected from the group consisting of nickel (Ni), copper (Cu), zinc (Zn), tin (Sn), silver (Ag), and gold (Au). For the formation of the first to third electrode layers, for example, a film formation technique, such as electrolytic plating, electroless plating, sputtering, vacuum deposition, chemical vapor deposition (CVD), cold spraying, and thermal spraying, may be used.

The first to third external electrodes may be, for example, a laminated structure of a Ni layer and a tin layer. The first to third external electrodes comprise a metal at least the outer surface thereof has excellent wettability with solder. Examples of such a metal include Sn, Au, Ag, and Pd.

For the first and second external electrodes, a Cu cap with an Sn surface film formed thereon in advance may bonded to the anode electrode layer, so as to serve as an external electrode.

The first and second external electrodes both constitute an anode terminal of the electrolytic capacitor. In mounting the electrolytic capacitor onto a substrate, it is necessary to connect both the first and second external electrodes to the electrode on the substrate. This is not always the case, however, and the first and second external electrodes may be electrically connected via a surface of the package body other than the first and second surfaces. In this case, in mounting the electrolytic capacitor onto the substrate, either the first or second external electrode may be connected to an electrode on the substrate.

[Production Method of Electrolytic Capacitor]

An electrolytic capacitor according to one embodiment of the present invention can be produced by a method including, for example, a first step of preparing an anode body, a second step of obtaining a plurality of capacitor elements, a third step of obtaining an element stack including a plurality of the capacitor elements stacked together, a fourth step of covering the element stack with a package body, a fifth step of forming an end surface of a first part so as to be exposed from the package body, and a sixth step of electrically connecting the end surface of the first part to an external electrode. The method may further include a step (separation layer disposing step) of disposing a separation layer (or an electrically insulating member) at part of the anode body.

Each step of the production method of an electrolytic capacitor will be described below.

(First Step)

In the first step, an anode body with a dielectric layer formed thereon is prepared. Specifically, an anode body having a first part including one end and a second part including an other end opposite to the one end, and having a dielectric layer formed at at least a surface of the second part is prepared. The first step includes, for example, a step of forming a porous portion at a surface of the anode body, and a step of forming a dielectric layer on a surface of the porous portion. Specifically, the anode body prepared in the first step has a first part including an end-to-be-removed (the above one end) and a second part including a second end (the above other end). The porous portion is preferably formed at at least a surface of the second part.

The porous portion may be formed at a surface of the anode body in any way as long as unevenness is formed at the surface of the anode body, for example, by roughening the surface of the anode foil by etching (e.g., electrolytic etching).

The dielectric layer may be formed by subjecting the anode body to a chemical conversion. The chemical conversion can be performed by, for example, immersing the anode body in a chemical conversion solution to impregnate the chemical conversion solution into the surface of the anode body, and applying a voltage to the anode body serving as an anode to cause current to flow between the anode and a cathode immersed in the chemical conversion solution. When the anode body has a porous portion at its surface, the dielectric layer is formed along the uneven contour of the surface of the porous portion.

(Separation Layer Disposing Step)

When producing an electrolytic capacitor having a separation layer (electrically insulating member), the step of disposing a separation layer (electrically insulating member) may be performed after the first step and before the second step. In this step, an insulating member is disposed at part of the anode body. Specifically, in this step, an insulating member is disposed on the first part of the anode body via the dielectric layer. The insulating member is disposed so as to provide separation between the first part and the cathode section formed in the later step.

In the separation layer disposing step, a sheet-like insulating member (e.g., a resin tape) may be attached to part (e.g., the first part) of the anode body. Even when using the anode body having a porous portion at its surface, the insulating member can be firmly attached to the first part by compressing and flattening the unevenness at the surface of the first part. The sheet-like insulating member preferably has an adhesive layer on the side to be brought into contact with the first part.

Other than the above, in the separation layer disposing step, an insulating member may be formed by applying or impregnating a liquid resin onto or into part of the anode body (e.g., the first part). For example, after applied or impregnated, the liquid resin is cured. In this case, the insulating member adhering to the first part can be easily formed. Examples of the liquid resin include a curable resin composition as exemplified in the fourth step (formation of package body), and a solution of a resin dissolved in a solvent.

When the anode body has a porous portion formed at a surface, it is preferable to apply or impregnate a liquid resin onto or into part of the surface of the porous portion of the anode body (e.g., the surface of the first part). In this case, the insulating member can be easily formed so as to fill the unevenness at the surface of the porous portion of the first part. The liquid resin can easily enter the recesses of the surface of the porous portion, and the insulating member can be easily formed inside the recesses, too. Since the porous portion at the surface of the anode body is protected with the insulating member in this way, the collapse of the porous portion of the anode body can be suppressed when the anode body is partially removed together with the package body in the fourth step. Since the surface of the porous portion of the anode body and the insulating member are firmly attached to each other, the insulating member is unlikely to be peeled off from the surface of the porous portion of the anode body when the anode body is partially removed together with the package body in the fourth step.

(Second Step)

In the second step, a cathode section is formed on the anode body, to obtain a capacitor element. When the insulating member is to be disposed, a cathode section is formed in the second step on the anode body at where the insulating member is not yet disposed, thereby to form a capacitor element. Specifically, in the second step, at least part of the dielectric layer formed on the surface of the second part of the anode body is covered with the cathode section.

The step of forming a cathode section includes, for example, a step of forming a solid electrolyte covering at least part of the dielectric layer, and a step of forming a cathode leading layer covering at least part of the solid electrolyte layer.

The solid electrolyte layer can be formed by, for example, chemically and/or electrochemically polymerizing a raw material monomer on the dielectric layer. The solid electrolyte layer may be formed by depositing a processing solution containing an electrically conductive polymer, followed by drying. The processing solution may further contain other components, such as a dopant. The conductive polymer may be, for example, poly(3,4-ethylenedioxythiophene) (PEDOT). The dopant may be, for example, polystyrene sulfonic acid (PSS). The processing solution is a dispersion or solution of the conductive polymer. Examples of a dispersion medium (solvent) include water, an organic solvent, and a mixture thereof.

The cathode leading layer can be formed by, for example, sequentially stacking a carbon layer and a silver paste layer on the solid electrolyte layer.

(Third Step)

In the third step, a plurality of the capacitor elements are stacked, into an element stack. In this step, for example, a plurality of the capacitor elements are stacked, with the cathode sections overlapped with each other via a conductive adhesive material, such that the first parts are oriented in opposite directions between the adjacent capacitor elements, and thus, an element stack is obtained.

Thereafter, the element stack is placed on a laminated substrate having a wiring pattern formed on its front and back sides, with the conductive adhesive material interposed therebetween. A third external electrode is formed in advance on the side of the laminated substrate opposite to the side on which the element stack is placed. By placing as above, the third external electrode is electrically connected to the cathode sections of the capacitor elements constituting the element stack, via the wiring pattern formed on the laminated substrate, and via through-holes connecting between the wiring pattern on the front side and the wiring pattern on the back side.

Other than the above, for example, a plate-like third external electrode processed into a predetermined shape may be bonded to a surface of the cathode section exposed at the lowermost or uppermost layer of the element stack, via a conductive paste or the like, to achieve an electrical connection between the element stack and the third external electrode.

The third external electrode may be formed by electrolytic plating, electroless plating, physical vapor deposition, chemical vapor deposition, cold spraying, and/or thermal spraying.

(Fourth Step)

In the fourth step, the element stack is covered with a package body. At this time, at least part of the third external electrode is left uncovered and exposed from the package body, without being covered entirely. The package body can be formed by, for example, injection molding. The package body can be formed, for example, using a predetermined mold, by charging a curable resin composition or a thermoplastic resin (composition) into a predetermined place, so as to cover the element stack.

The curable resin composition may include, in addition to the curable resin, for example, a filler, a curing agent, a polymerization initiator, and/or a catalyst. Examples of the curable resin include epoxy resin, phenolic resin, urea resin, polyimide, polyamide imide, polyurethane, diallyl phthalate, and unsaturated polyester. Examples of the thermoplastic resin include polyphenylene sulfide (PPS) and polybutylene terephthalate (PBT). A thermoplastic resin composition containing a thermoplastic resin and a filler may be used.

The filler is preferably, for example, electrically insulating particles and/or fibers. Examples of an electrically insulating material constituting the filler include: an electrically insulating compound (e.g., oxide), such as silica or alumina; glass; and a mineral material (e.g., talc, mica, clay). The package body may contain one kind or two or more kinds of these fillers.

(Fifth Step)

In the fifth step, after the fourth step, an end surface of the first part is formed, so as to be exposed from the package body. Specifically, on the both end sides of the element stack, at least the anode bodies are partially removed together with the package body, so that at least the first ends (specifically, end surfaces of the first ends) of the anode bodies are exposed on both the first and second surface sides. As for a method of exposing the first ends from the package body, for example, after the capacitor elements are covered with the package body, the surface of the package body may be polished, or the package body may be partially cut off such that the first ends are exposed from the package body. The first parts may be partially cut away together with the package body. In this case, the first ends each including no porous portion and having a surface with no natural oxide film formed thereon can be easily exposed from the package body, making it possible to achieve a low-resistance and reliable connection between the first part and the external electrode. A preferable cutting method of the package body is dicing. This allows the end surfaces of the first ends of the first parts to be exposed from the cut surface. It is to be noted here that the element stack has two kinds of capacitor elements differing in the direction in which the first part is oriented. Therefore, when partially cutting the first parts together with part of the package body, it is necessary to cut at two different positions. One of the two cut surfaces becomes the first surface, and the other becomes the second surface.

In the fifth step, on the both end sides of the element stack, the anode bodies and the insulting members may be partially removed together with the package body, so that the end surfaces of the first ends and the end surfaces of the insulting members are exposed from the package body. In this case, the anode bodies and the insulting members can both have end surfaces exposed from the package body and being flush with each other. In this way, the end surfaces of the anode bodies and the end surfaces of the insulting members, which are flush with each other, can be each easily exposed from the package body.

By the fifth step, the end surfaces of the anode bodies (first ends) with no natural oxide film formed thereon can be easily exposed from the package body, and thus, a low-resistance and reliable connection between the anode bodies (specifically, the first parts) and the external electrode can be obtained.

(Sixth Step)

In the sixth step, the end surfaces of the anode bodies (first ends) exposed from the package body are electrically connected to the external electrode. In this step, for example, a first external electrode is formed so as to cover the first surface of the package body, and a second external electrode is formed so as to cover the second surface, and then, the external electrodes are electrically connected respectively to the end surfaces of the first ends. The electric connection between the end surfaces of the first ends and the external electrodes may be achieved by bonding or the like, or by electrolytic plating, electroless plating, physical vapor deposition, chemical vapor deposition, cold spraying, and/or thermal spraying.

Prior to forming the first and second external electrodes, a step of forming a contact layer on the end surfaces of the first ends, and/or, a step of forming an anode electrode layer covering the first or second surface of the package body may be performed. When the anode electrode layer is formed, the first and second external electrodes are formed so as to cover the anode electrode layer.

(Step of Forming Contact Layer)

The contact layer can be formed by a technique, such as cold spraying, thermal spraying, plating, and vapor deposition. The contact layer may be formed so as to selectively cover the end surfaces of the first ends, while covering as little as possible the first and second surfaces of the package body.

In the case of using cold spraying, the contact layer can be formed by forcing metal particles to collide with the end surfaces of the first ends at a high speed. The metal particles may be metal particles having an ionization tendency lower than that of the metal constituting the anode body. For example, when the anode body is an Al foil, the metal particles may be Cu particles. In this case, the Cu particles collided at a high speed with the end surfaces of the first ends break through the natural oxide film (Al oxide film) formed on the end surfaces, forming a metal bond of Al and Cu. As a result, an alloy layer of Al and Cu can be formed at the interface between the contact layer and the first end. On the other hand, the surface of the contact layer is covered with a Cu layer which is a non-valve action metal. Since the ionization tendency of Cu is lower than that of Al, the surface of the contact layer is hardly oxidized, which can provide a reliable electrical connection with the external electrode (or the anode electrode layer).

The cold spraying is a technique of accelerating metal particles of several μm to several tens of μm in size from a subsonic speed to a supersonic speed by a compressed gas, such as air, nitrogen, or helium, to force the particles to collide in a solid state with a base material, thereby to form a metal surface film. Although the adhesion mechanism of metal particles in the cold splaying is not yet totally clarified, it is generally considered that due to the collision energy of the metal particles, the metal particles or the metal base material is plastically deformed, allowing a new surface to appear on the metal surface, and thus activated.

In the above cold spraying, the metal particles can collide with the first and second surfaces of the package body constituted of a non-metal material, as well as with the end surfaces of the separation layers (insulating members).

When the base material with which the metal particles collide is a resin base material, the bonding between the metal particles and the resin base material is considered to be mainly through a mechanical joining, resulted from fitting of the plastically deformed metal particles into the unevenness at the surface of the resin base material. Therefore, in order to form a film of the metal on the surface of the resin base material, it is necessary that: (ia) sufficient hardness is imparted to the resin base material, so that the energy of the collision can be efficiently used for the plastic deformation of the metal particles; (iia) the metal material and its processing conditions are selected so that the plastic deformation of the metal particles can easily occur; and (iiia) the resin base material is unlikely to be destroyed by the energy of the collision.

Conversely, in the case of not allowing the metal particles to be attached firmly to the resin base material, it is necessary that (ib) elasticity is imparted to the resin base material, so that the collision energy is prevented from being converted into an energy for plastic deformation; (iib) the metal material and its processing conditions are selected so that the plastic deformation is unlikely to occur, within a range where the contact layer can be formed on the end surfaces of the first ends, and (iiib) the strength of the resin base material is reduced, so that the base material can be destroyed by the force equal to or less than the impact of the plastic deformation.

In general, when the Young's modulus of the metal particles is smaller than that of a member (e.g., filler) constituting the resin base material, the plastic deformation upon collision with the metal particles tends to be facilitated, and when it is larger, the plastic deformation upon collision with the metal particles tends to be suppressed. In the latter case, the collision energy of the metal particles causes the resin base material to be brittle-broken, scraping off the surface of the resin base material.

Therefore, by setting the Young's modulus of the metal particles (or of the contact layer) to be larger than that of the filler contained in the resin base material, a state can be created in which the metal particles are unlikely to attach firmly to the resin base material. Thus, the formation of the contact layer on the first and second surfaces of the package body and the end surfaces of the separation layers (insulating members) is suppressed, and the contact layer can be selectively formed on the end surfaces of the first ends. Also, by forcing the metal particles to collide with the first and second surfaces of the package body, the first and second surfaces can be roughened.

For example, when a silica having a Young's modulus of 94 GPa is packed in the package body, Cu particles and Ni particles can be used as metal particles that have a Young's modulus larger than that of the silica and that can be joined easily with Al. However, this is not a limitation because the firmness of the attached state varies depending also on the shape, size, temperature of the metal particles and on the size, packing ratio, and the like of the silica to be packed in the resin material.

(Step of Forming Anode Electrode Layer)

The anode electrode layer can be formed so as to cover the end surfaces of the first ends or the contact layers, the first and second surfaces of the package body, and, in the case of providing a separation layer, so as to cover the end surfaces of the separation layers (insulating members).

The anode electrode layer may be formed by applying a conductive paste containing electrically conductive particles and a resin material. Specifically, the anode electrode layer can be formed by applying a conductive paste (e.g., silver paste) onto each end surface by a technique, such as dipping, transferring, printing, and dispensing, and then curing it at a high temperature.

Other techniques, such as electrolytic plating, electroless plating, sputtering, vacuum deposition, chemical vapor deposition (CVD), cold spraying, and thermal spraying, may be used, to form an anode electrode layer being a metal layer.

Embodiment 2

The third external electrode may be electrically connected to the cathode section of the capacitor element. The third external electrode can be electrically connected to the cathode section, for example, at the side of the element stack. The substrate 17 may be, for example, a resin substrate. In this case, the third external electrode is electrically connected to the cathode section only at the side of the element stack.

The cathode section is electrically connected to the third external electrode at a side surface of the cathode leading layer, for example, via a cathode electrode layer. The cathode electrode layer may be formed by the application of a conductive paste containing electrically conductive particles and a resin material. Specifically, the cathode electrode layer can be formed by applying a conductive paste (e.g., silver paste) onto each end surface by a technique, such as dipping, transferring, printing, and dispensing, and then curing it at a high temperature. Other techniques, such as electrolytic plating, electroless plating, sputtering, vacuum deposition, chemical vapor deposition (CVD), cold spraying, and thermal spraying, may be used, to form a cathode electrode layer being a metal layer.

In the aforementioned fifth step, the package body covering the side surface of the cathode leading layer is removed, as to expose the side surface of the cathode leading layer from the package body. To remove the package body, for example, the surface of the package body may be polished, or the package body may be cut by, for example, dicing, so as to expose the end surface of the cathode leading layer at the side of the element stack. In this way, the cathode leading layer can be exposed from the side surface of the electrolytic capacitor, and electrically connected to the third external electrode.

Figure 3:
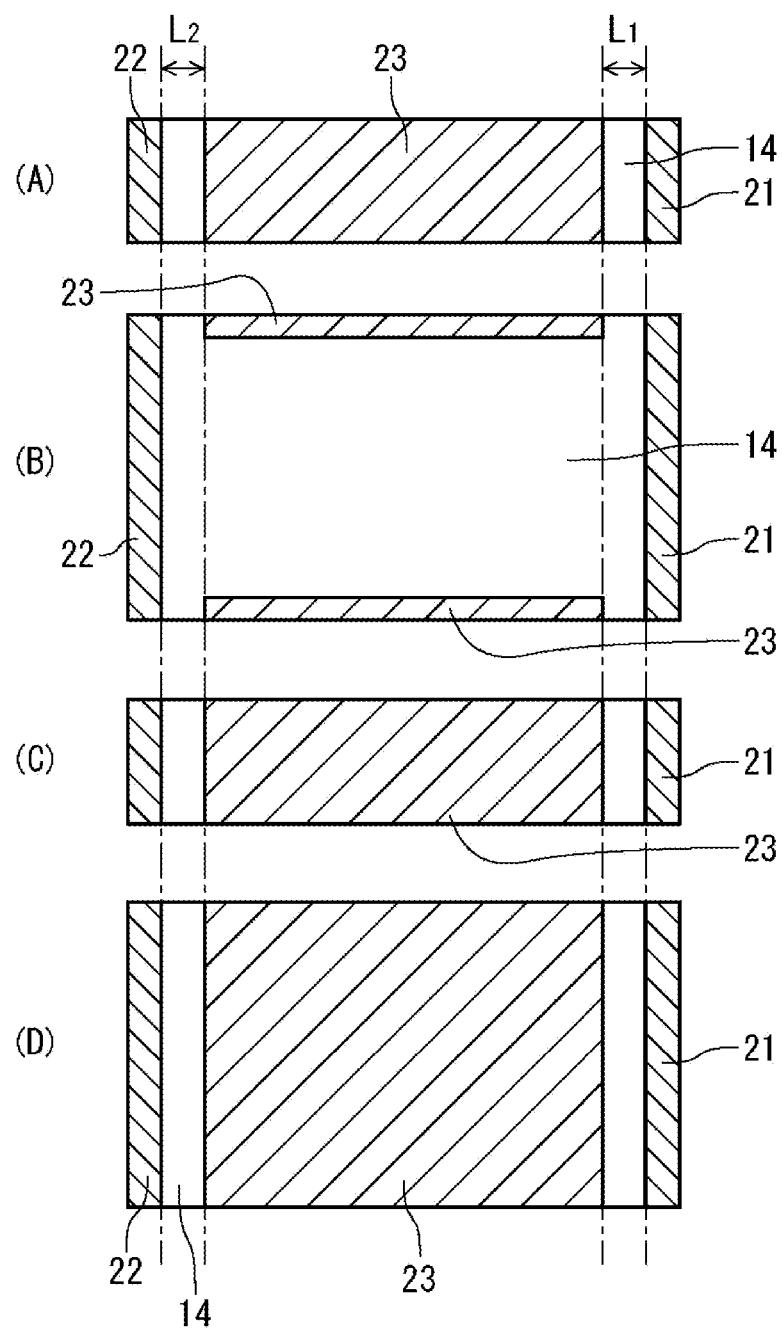
FIG. 3 A diagram illustrating an example of a pattern of external electrodes formed on a surface of an electrolytic capacitor.
Figure 4:
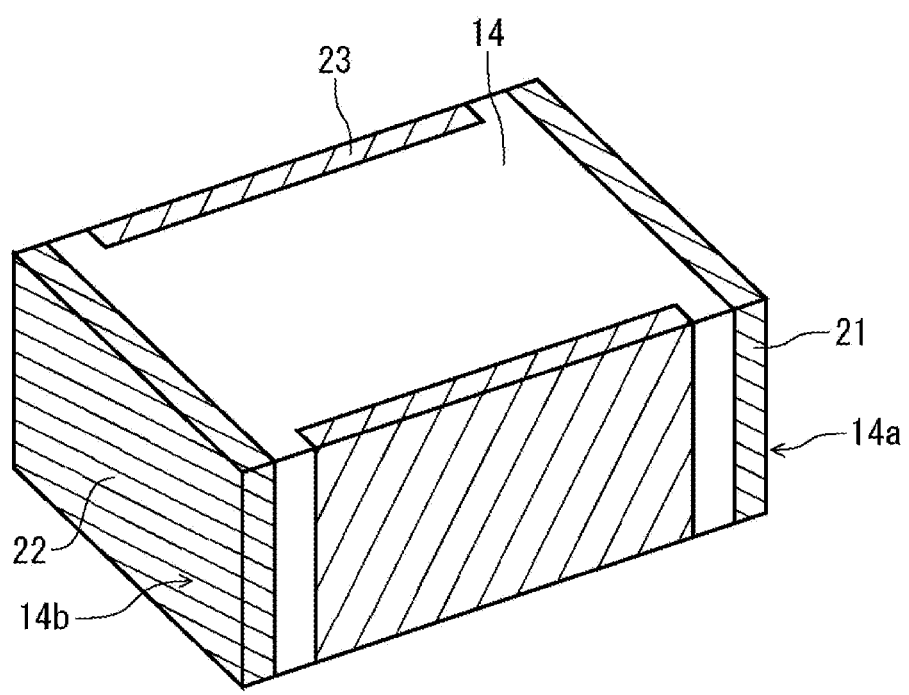
FIG. 4 A schematic oblique view illustrating the appearance of an electrolytic capacitor according to one embodiment of the present invention.

FIG. 3 shows an example of a pattern of the first external electrode 21, the second external electrode 22, and the third external electrode 23 formed on the surfaces of the electrolytic capacitor. In FIG. 3, (A) is a pattern on the right side surface of the electrolytic capacitor, (B) is a pattern on the upper surface of the electrolytic capacitor, (C) is a pattern on the left side surface of the electrolytic capacitor, and (D) is a pattern on the lower surface of the electrolytic capacitor. The right side surface, the upper surface, the left side surface, and the lower surface are surfaces that intersect the first surface 14a and the second surface 14b of the package body. FIG. 4 is a schematic oblique view illustrating the appearance of the electrolytic capacitor of FIG. 3.

In the illustrated examples of FIGS. 3 and 4, the first external electrode 21 extends so as to cover the first surface 14a of the package body, and partially cover the side surfaces thereof continuing from and intersecting the first surface. At the first surface, and, at parts of the side surfaces, the end surfaces of the first ends of the first capacitors are exposed, and the first external electrode is electrically connected to the anode leading part. Likewise, the second external electrode 22 extends so as to cover the second surface 14b of the package body, and partially cover the side surfaces thereof continuing from and intersecting the second surface. At the second surface, and, at parts of the side surfaces, the end surfaces of the first ends of the second capacitors are exposed, and the second external electrode is electrically connected to the anode leading part.

With regard to the clearance $L_1$ between the first external electrode 21 and the third external electrode 23 at the side surface, and, the clearance $L_2$ between the second external electrode 22 and the third external electrode 23 at the side surface, the shorter the clearances are, the smaller the ESL tends to be. The clearance $L_1$ and the clearance $L_2$ may be, for example, 0.4 mm to 1.1 mm.

At least one third external electrode may be formed on each of both side surfaces of the electrolytic capacitor. As illustrated in FIG. 3, the third external electrode may be formed so as to cover 50% or more of the side surface. At the lower surface, the third external electrodes 23 may be continued, constituting one cathode terminal as a whole.

The electrolytic capacitor has an approximately rectangular parallelepiped outer shape. When the electrolytic capacitor is viewed from the above, the first surface and the second surface may be at the short sides of the rectangle, and both the side surfaces may be at the long sides of the rectangle. In other words, the distance between the first and second surfaces may be longer than the distance between the side surfaces.

Figure 5:
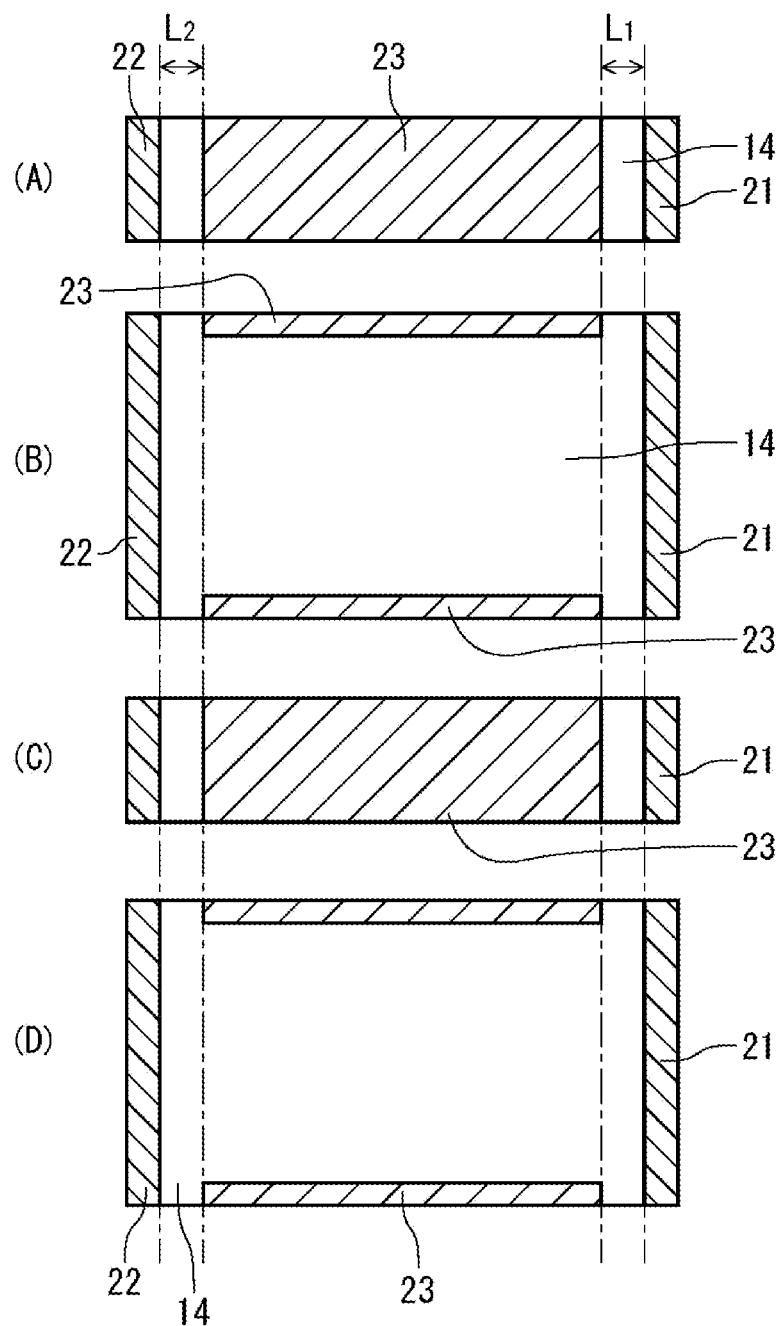
FIG. 5 A diagram illustrating an example of a pattern of external electrodes formed on a surface of an electrolytic capacitor.
Figure 6:
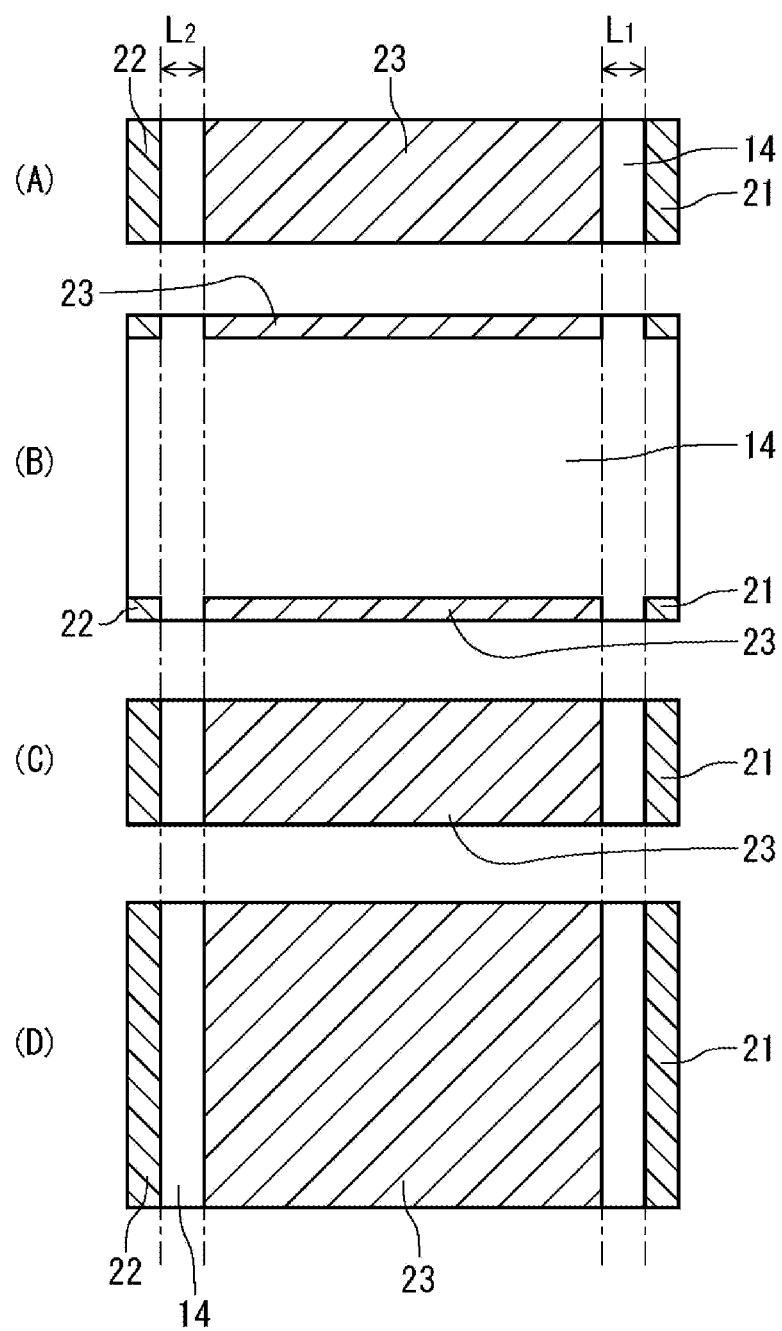
FIG. 6 A diagram illustrating an example of a pattern of external electrodes formed on a surface of an electrolytic capacitor.
Figure 7:
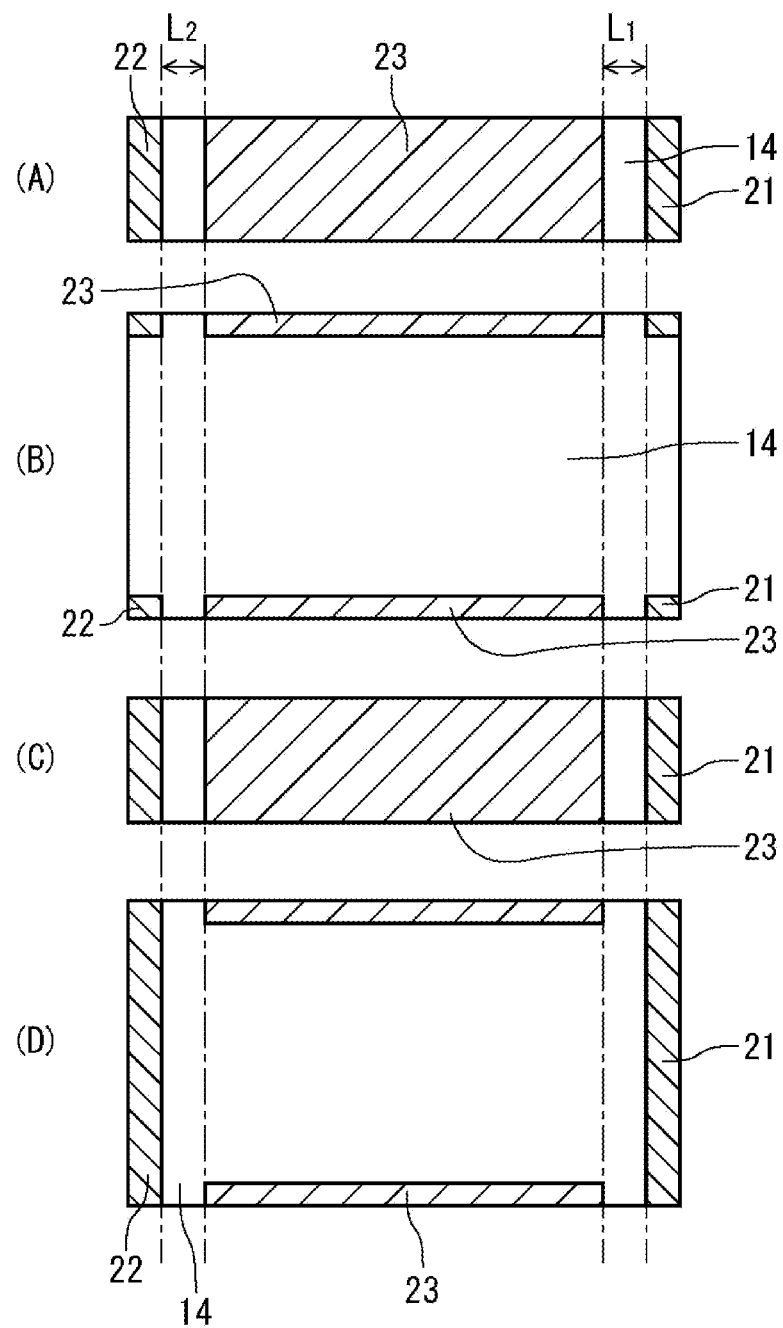
FIG. 7 A diagram illustrating an example of a pattern of external electrodes formed on a surface of an electrolytic capacitor.

FIGS. 5 to 7 each show another example of a pattern of the first external electrode 21, the second external electrode 22, and the third external electrode 23 formed on the surfaces of the electrolytic capacitor. In FIGS. 5 to 7, like in FIG. 3, (A) is a pattern on the right side surface of the electrolytic capacitor, (B) is a pattern on the upper surface of the electrolytic capacitor, (C) is a pattern on the left side surface of the electrolytic capacitor, and (D) is a pattern on the lower surface of the electrolytic capacitor.

As illustrated in FIGS. 5 and 7, the third external electrodes may form two separated cathode terminals, without being continued at the bottom. In this case, the man-hours in the electrolytic capacitor production can be more reduced than in the case of configuring as in FIG. 3, and the production can be simplified.

Figure 8:
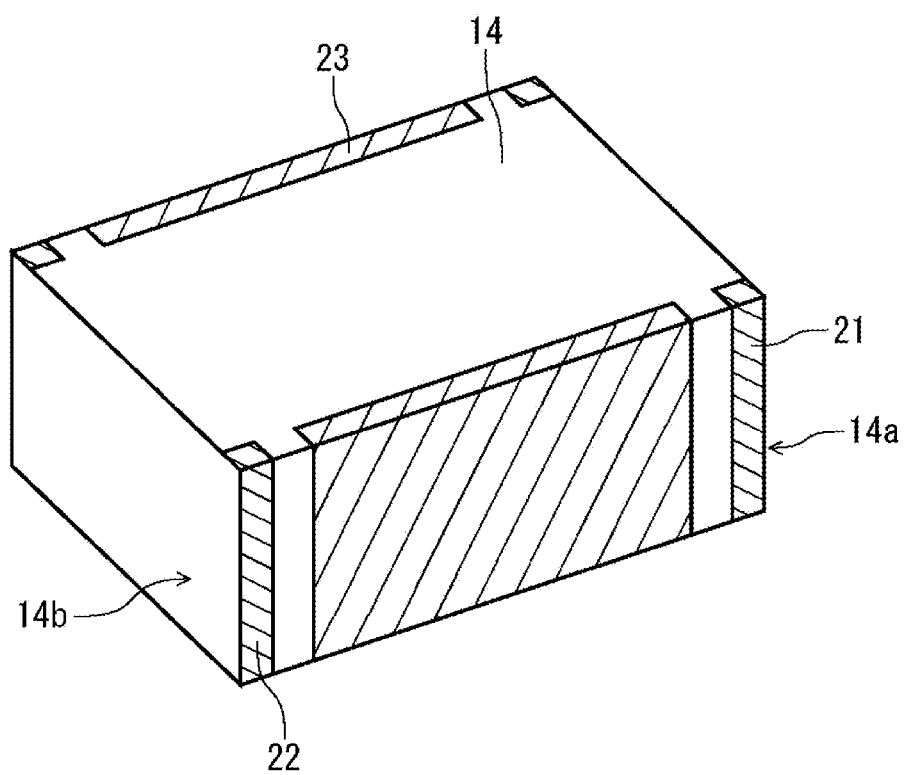
FIG. 8 A schematic oblique view illustrating the appearance of an electrolytic capacitor according to one embodiment of the present invention.
Figure 9:
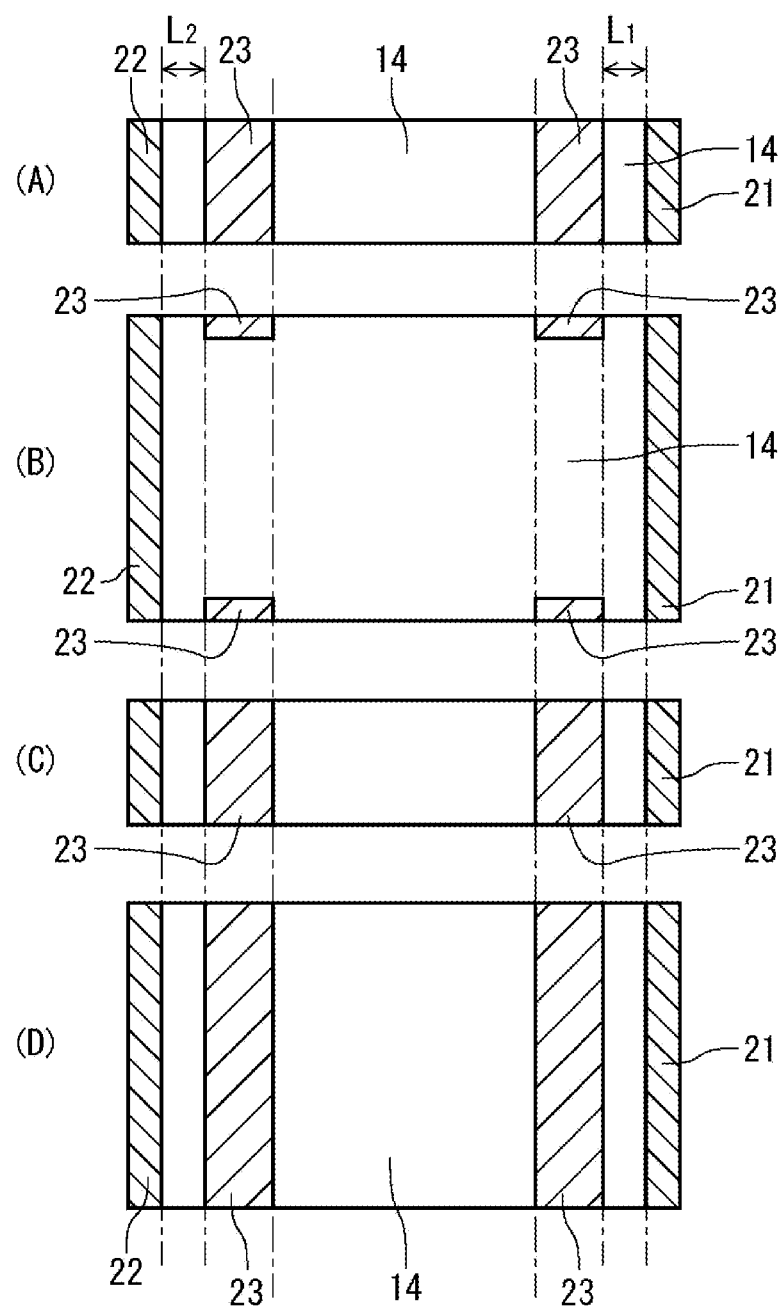
FIG. 9 A diagram illustrating an example of a pattern of external electrodes formed on a surface of an electrolytic capacitor.
Figure 10:
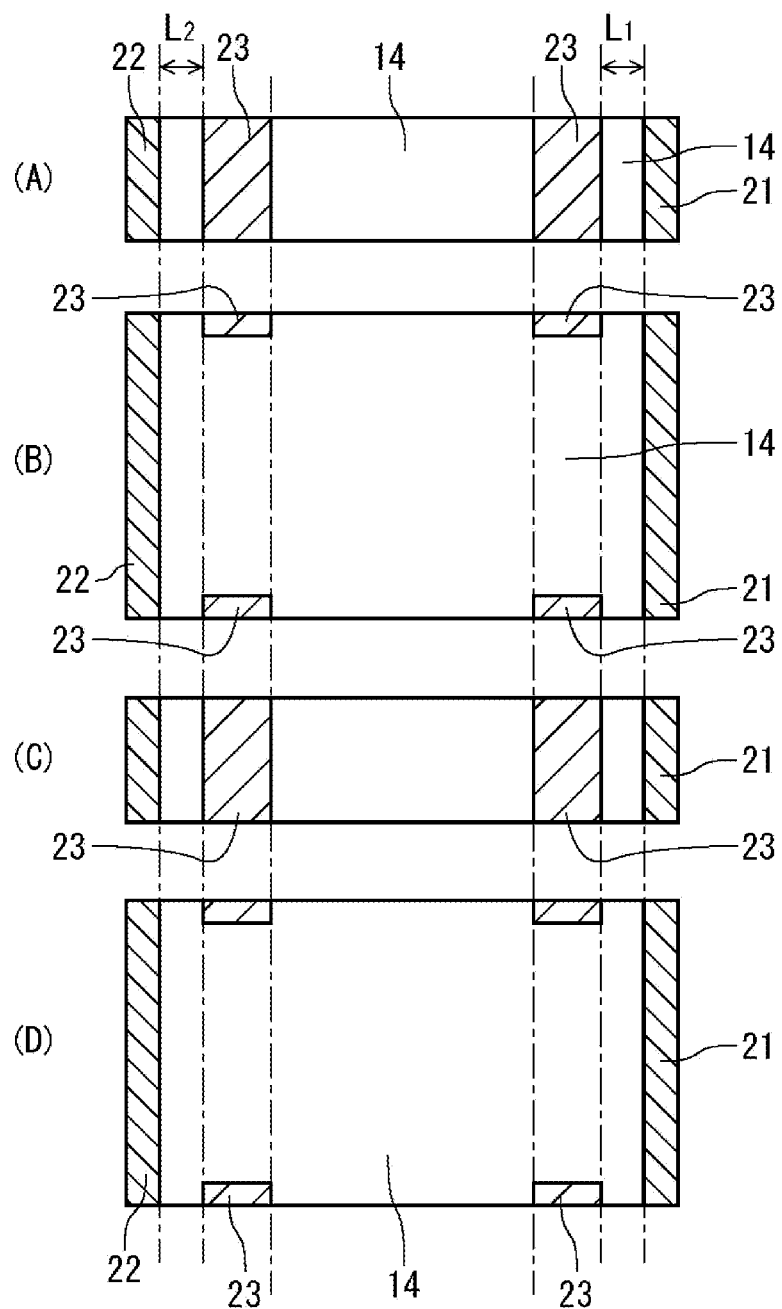
FIG. 10 A diagram illustrating an example of a pattern of external electrodes formed on a surface of an electrolytic capacitor.
Figure 11:
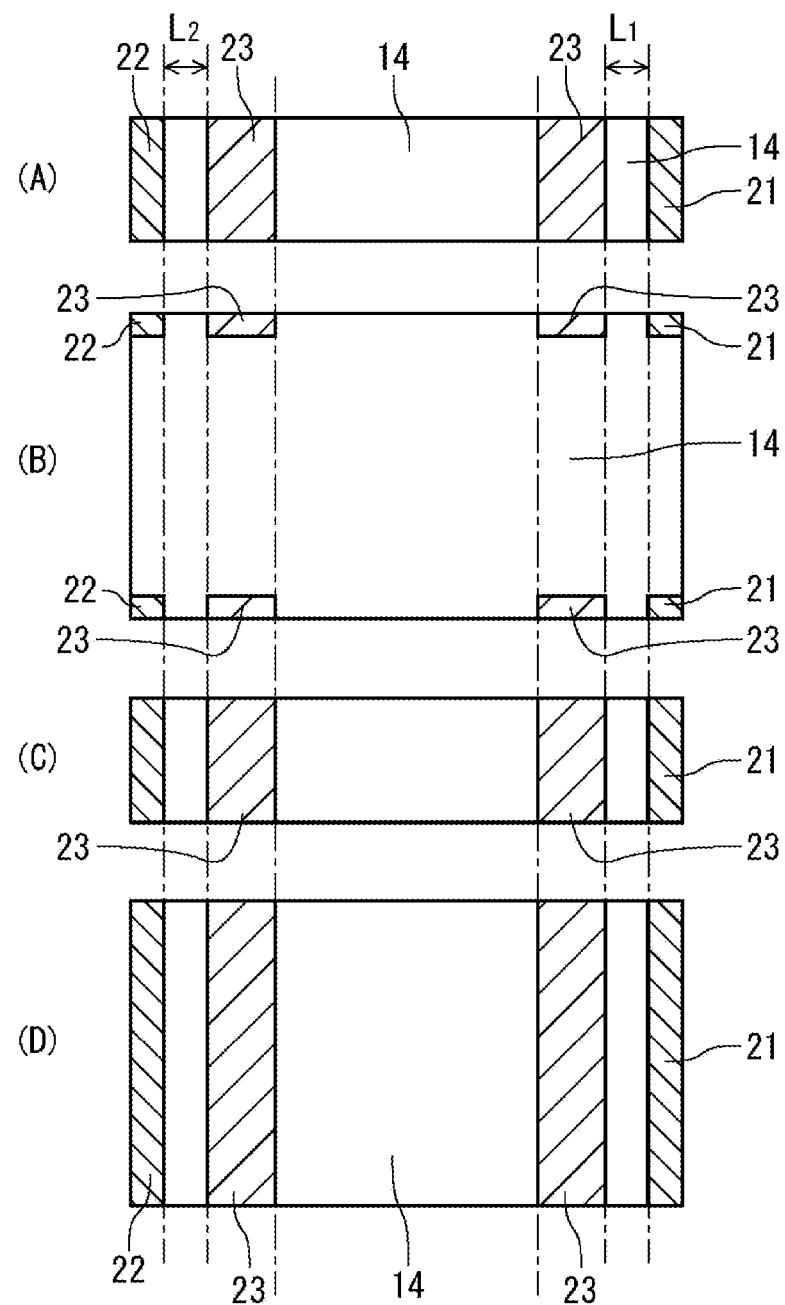
FIG. 11 A diagram illustrating an example of a pattern of external electrodes formed on a surface of an electrolytic capacitor.
Figure 12:
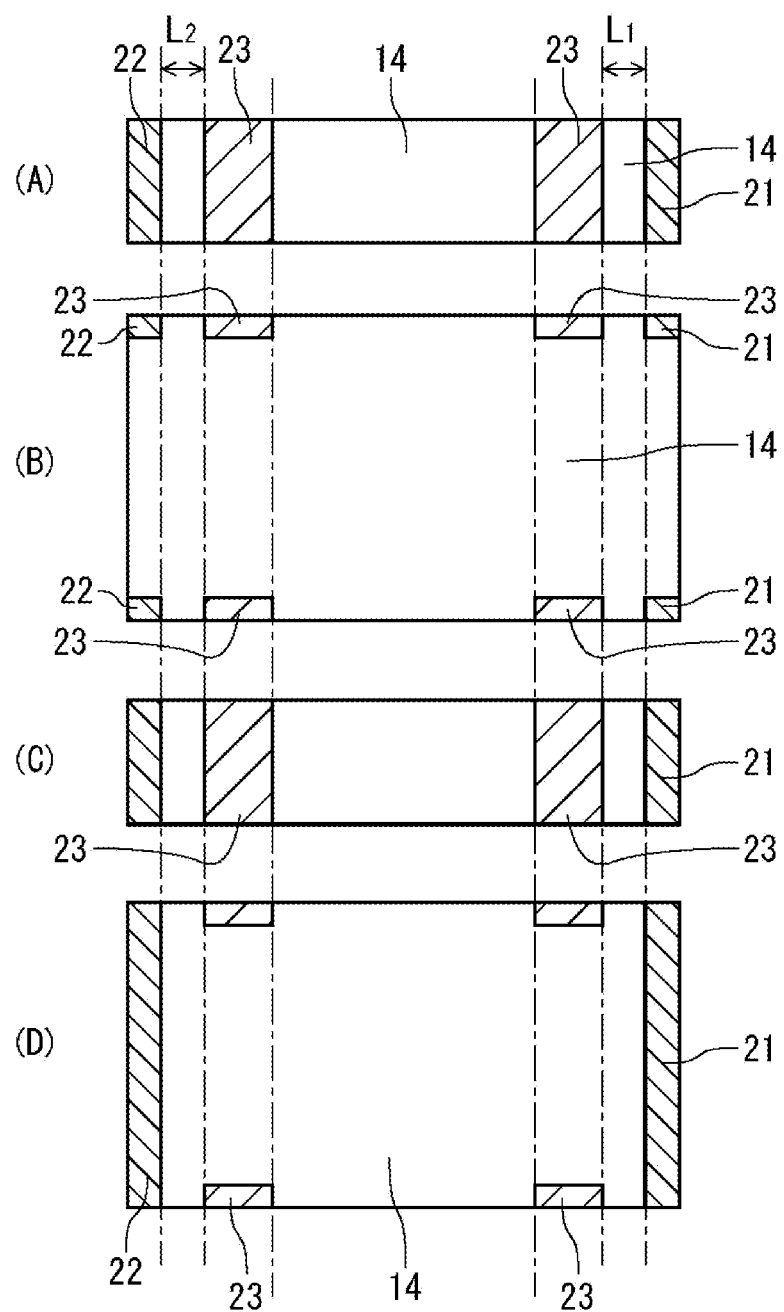
FIG. 12 A diagram illustrating an example of a pattern of external electrodes formed on a surface of an electrolytic capacitor.

FIG. 8 is a schematic oblique view illustrating the appearance of the electrolytic capacitor of FIG. 6 or 7. As illustrated in FIG. 8, the first external electrode 21 does not cover the first surface of the package body, and covers parts of the side surfaces intersecting the first surface. Likewise, the second external electrode 22 does not cover the second surface of the package body, and covers parts of the side surfaces intersecting the second surface. The first external electrode 21 is electrically connected to the end surface of the first end of the first capacitor only at the side surface intersecting the first surface. The second external electrode 22 is electrically connected to the end surface of the first end of the second capacitor only at the side surface intersecting the second surface.

In order to reduce the ESL, a plurality of the third external electrodes 23 may be disposed at the bottom and/or the sides. In this case, one of the plurality of the third external electrodes 23 can be placed in proximity to the first external electrode 21, and another one of the plurality of the third external electrodes 23 can be placed in proximity to the second external electrode 22. This can effectively reduce the ESL. The clearance $L_1$ between the first external electrode 21 and one of the third external electrodes 23, and, the clearance $L_2$ between the second external electrode 22 and another one of the third external electrodes 23 may be, for example, 0.4 mm to 1.1 mm.

That "a plurality of third external electrodes are disposed" means that the third external electrode is exposed at a plurality of regions spaced from each other, and does not necessarily mean that the plurality of the third external electrodes are spaced from each other. For example, two or more of the plurality of the third external electrodes may be continuously formed within the package body and may be electrically connected to each other. The plurality of the third external electrodes may be disposed at different surfaces of the package body. For example, one of them may be disposed at the top surface, and another one of them may be disposed at the bottom or side surface of the package body.

FIGS. 9 to 12 each show another example of a pattern of the first external electrode 21, the second external electrode 22, and the third external electrode 23 formed on the surfaces of the electrolytic capacitor having a plurality of third external electrodes. FIGS. 9 to 12 are respectively variations of FIG. 3 and FIGS. 5 to 7, in which one third external electrode 23 (in FIGS. 5 and 7, two on both side surfaces) extending in the direction from the first surface toward the second surface is divided in the above direction, and one of them is placed in proximity to the first external electrode 21, and the other is placed in proximity to the second external electrode 22.

Other configurations of the electrolytic capacitor according to Embodiment 2 are similar to those of Embodiment 1, and the detailed description thereof is omitted.

INDUSTRIAL APPLICABILITY

The electrolytic capacitor according to the present invention has a high capacitance and can be used for various applications where low ESL is required.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: first part (anode leading part)
   1a: first end
2: second part (cathode forming part)
   2a: second end
3: anode body
4: core
5: porous portion
6: cathode section
7: solid electrolyte layer
8: carbon layer
9: silver paste layer
10: capacitor element
   10a: first capacitor element
   10b: second capacitor element
11: electrolytic capacitor
12: separation layer (insulating member)
13: adhesive layer
14: package body
   14a: first surface of package body
   14b: second surface of package body
15: contact layer
16: anode electrode layer
17: substrate
21: first external electrode
22: second external electrode
23: third external electrode

The invention claimed is:

1. An electrolytic capacitor, comprising:
an element stack including a plurality of capacitor elements stacked together;
a package body sealing the element stack;
a first external electrode;
a second external electrode; and
a plurality of third external electrodes, wherein:
each of the plurality of the capacitor elements includes:
an anode body having a porous portion at a surface,
a dielectric layer formed on at least part of a surface of the porous portion,
a cathode section covering at least part of the dielectric layer,
a first end at which the anode body is exposed, and
a second end covered with the cathode section,
at least an end surface of the first end is exposed from the package body,
the plurality of the capacitor elements includes a first capacitor element in which the first end faces a first surface of the package body, and a second capacitor element in which the first end faces a second surface different from the first surface of the package body,
in the element stack, the first capacitor element and the second capacitor element are stacked alternately,
the first end of the first capacitor element is electrically connected to the first external electrode, and the first end of the second capacitor element is electrically connected to the second external electrode,
the plurality of third external electrodes are electrically connected to the cathode section of the capacitor element,
at least one of the plurality of third external electrodes is placed closer to the first external electrode than the second external electrode,
the electrolytic capacitor has a top surface, a bottom surface, and a pair of side surfaces opposite to each other and each connecting between the top surface and the bottom surface,
as viewed from exterior of the electrolytic capacitor, the plurality of third external electrodes are exposed on the pair of side surfaces and on the bottom surface of the electrolytic capacitor, with a plurality of exposed regions, and
in each of the plurality of exposed regions, the plurality of third external electrodes are exposed continuously along the package body from one of the pair of side surfaces to the bottom surface of the electrolytic capacitor, but are not exposed continuously from the bottom surface to the other of the pair of side surface of the electrolytic capacitor, and the plurality of third external electrodes extend, at the one of the pair of side surfaces, from the bottom surface to the top surface so as to cover only a part of the top surface.

2. The electrolytic capacitor according to claim 1, wherein the plurality of third external electrodes are electrically connected to the cathode section at an outermost layer of the element stack.

3. The electrolytic capacitor according to claim 1, wherein the first end is electrically connected to the first external electrode or the second external electrode via a contact layer.

4. The electrolytic capacitor of claim 3, wherein the contact layer contains a metal having a smaller ionization tendency than a metal constructing the anode body.

5. The electrolytic capacitor of claim 3, wherein the package body contains no filler, or, when the package body contain a filler, a Young's modulus of the filler is smaller than a Young's modulus of the contact layer.

6. The electrolytic capacitor according to claim 3, wherein an alloy layer is formed at an interface between the contact layer and the anode body.

7. The electrolytic capacitor according to claim 3, wherein an anode electrode layer covering the first surface or the second surface of the package body is interposed between the contact layer and at least one of the first external electrode and the second external electrode.

8. The electrolytic capacitor according to claim 7, wherein the anode electrode layer contains a conductive resin layer in which electrically conductive particles are mixed.

9. The electrolytic capacitor according to claim 7, wherein at least one of the first surface and the second surface covered with the anode electrode layer has a surface roughness Ra of 5 micrometers or more.

10. The electrolytic capacitor according to claim 1, wherein the first external electrode and the second external electrode are opposed to each other, in a shorter direction of the anode body.

11. The electrolytic capacitor according to claim 1, wherein the first external electrode and the second external electrode are opposed to each other, in a longer direction of the anode body.

12. The electrolytic capacitor according to claim 1, wherein another one of the plurality of third external electrodes is placed closer to the second external electrode than the first external electrode.

13. The electrolytic capacitor according to claim 12, wherein the plurality of exposed regions include at least two exposed regions each placed closer to the second external electrode than the first external electrode, and in the bottom surface opposing to each other.

14. The electrolytic capacitor according to claim 1, wherein the plurality of exposed regions include at least two exposed regions each placed closer to the first external electrode than the second external electrode, and in the bottom surface opposing to each other.

* * * * *